Feb. 10, 1931.  J. M. LARSON  1,792,230
ACCELERATOR FOR TEMPERATURE CONTROL
Filed June 14, 1926

Inventor.
John M. Larson
Jones, Addington, Ames & Seibold
Attys.

Patented Feb. 10, 1931

1,792,230

UNITED STATES PATENT OFFICE

JOHN M. LARSON, OF CHICAGO, ILLINOIS, ASSIGNOR TO NATIONAL REGULATOR CO., OF CHICAGO, ILLINOIS, A CORPORATION OF ILLINOIS

ACCELERATOR FOR TEMPERATURE CONTROL

Application filed June 14, 1926. Serial No. 115,701.

My invention relates to tanks and the like wherein the temperature of the liquid contained therein is required to be kept at or near a constant and has particular reference to devices for automatically controlling the temperature governing elements employed for such purposes.

Various forms and designs of hot and cold water systems thermostatically controlled have been manufactured and operated, but in all of said devices, within my knowledge, the thermostat operating the valves for admitting the temperature changing fluid such as steam has produced a somewhat sluggish action until a certain pressure has been attained whereupon the diaphragm valve is either fully opened or fully closed by a rapid motion, so that the temperature changing fluid is admitted into proximity with the liquid in the tank in its full capacity or entirely cut off from the same.

The object of my invention is to provide an accelerator or balancing device which will give a graduated action between the thermostatic member and the pressure control valve for admitting the temperature changing fluid so that an almost constant temperature of the liquid within the tank can be maintained at all times. This is accomplished by means of the thermostatic member controlling the fluid pressure in the accelerator, and consequently, the pressure admitted to the temperature changing fluid or diaphragm valve. By this method of control, a balancing effect is produced so that any amount of fluid from zero to maximum may be admitted to the tank through the valve in order to keep the temperature of the liquid therein at or very close to a predetermined degree. The principle employed is to provide a diaphragm actuated by a very small amount of fluid pressure governed by the thermostatic device and to utilize this action for controlling a large amount of fluid pressure for actuating the valve which admits temperature changing fluid to the tank.

Other objects and advantages of my invention will be readily understood and appreciated as the invention becomes better understood by reference to the following description when considered in connection with the accompanying drawing in which:—

Like symbols of reference herein indicate like parts in each of the figures of the drawing.

Figure 1:
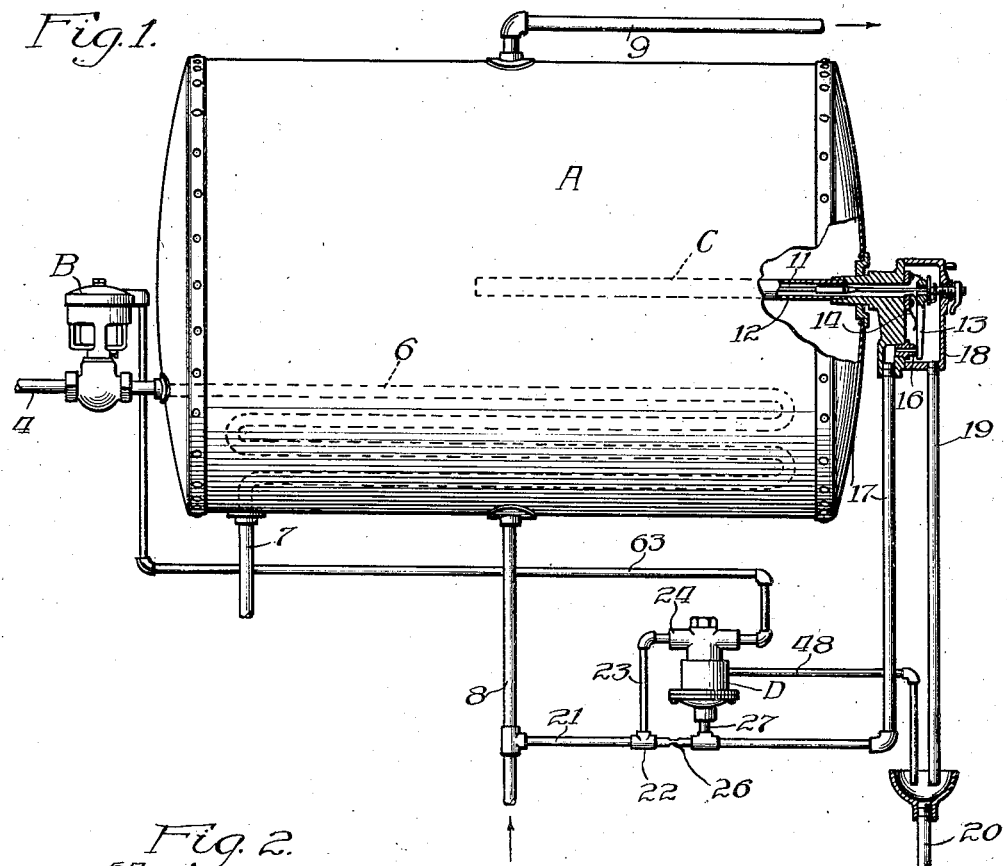
Figure 1 is a side elevation of a tank showing the thermostatic device partly in section and in communication with the admission valve through the accelerator.
Figure 2:
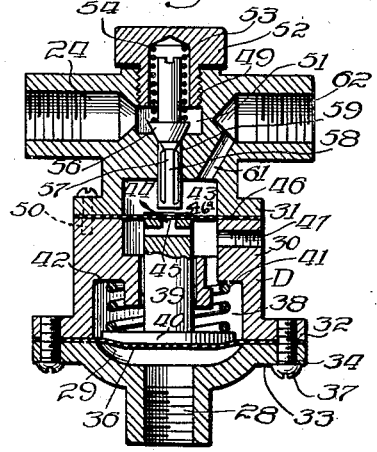
Fig. 2 is a vertical sectional view of the accelerator.
Figure 3:
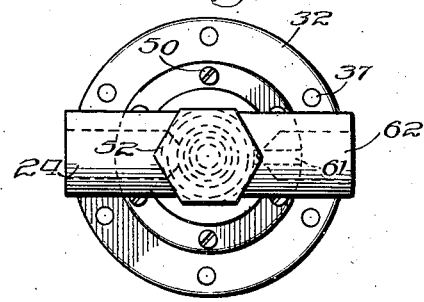
Fig. 3 is a top plan view of same.

In the following description let us assume that the tank A is used as a container for water heated through the agency of coils 6 which may be of any number of convolutions and have the valve B controlling the admission of steam thereto from the supply conduit 4 while the pipe 7 shown as the termination of the lowest convolution in the tank is used for carrying off the steam after it has circulated through the coils. 8 represents the supply conduit for admitting water or other liquid to be heated to the tank A and 9 represents the discharge conduit through which the contents of said tank are drawn for consumption at any desired locality.

The tank is provided with what is known in the trade as an extension duct thermostat C in which there is a column or rod 11 of non-expansible material and a tube 12 surrounding the same, said tube being of a material readily affected by temperature changes so as to provide expansion and contraction of the same about the column or rod 11. The column or rod 11 is provided at its outer end with a valve lever 13 and in the position shown in the drawing the expansible and contractible tube 12 is shown as being expanded by the temperature of the liquid in the tank A and the column 11 drawn inward carrying the valve lever 13 in the same direction. As the temperature in the tank A drops, the thermostatic tube 12 will contract releasing the pressure on the rod or column 11 and the valve lever 13, assisted by the action of the spring 14, will be pressed outwardly and away from its engagement with the port 16 so as to permit communication from the conduit 17 to the interior of the thermostatic casing 18. The thermostatic casing is also provided at the bottom of the same with the pipe 19 for discharging water or other fluids therefrom into the drain or waste pipe 20.

The liquid supply conduit 8 is provided with a take-off conduit 21, which in turn is provided with a T joint 22 which provides a connection for the conduit 23 which communicates with the pressure port 24 of the accelerator D. The conduit 21 at a point beyond the T 22 has a restriction 26 therein and beyond which is another take-off conduit 27 which communicates with a port 28 leading to the lower diaphragm chamber 29.

The accelerator D consists of a body portion comprising the members 30 and 31 and the lower portion 30 has a flange 32 to which is attached a cap 33 having the port 28 therein. The cap 33 has a flange 34 and the diaphragm 36 is held at its periphery between the said flange and the flange 32 on the body portion and securely clamped by means of the screws 37. The lower end of the body has a recess 38, while a plunger member 39 has its lower bearing flange 40 resting against the upper face of said diaphragm and is normally urged against the same by the spiral spring 41 which rests against said flange and against the shoulder 42 formed by the recess 38. The plunger 39 has its upper end extending into a central chamber 43 and is provided with a T shaped passageway 44 in the end of the same, the leg of which extends through the center of the end of said plunger and communicates with a central opening 45 in the diaphragm 46. The periphery of said diaphragm 46 is retained at the joining points between the flanges of the upper and lower portions 30 and 31 by means of the screws 50. This diaphragm divides the central chamber 43 while the arms of said T shaped passageway communicate with that portion of the chamber 43 below the said diaphragm so as to be in communication with an exhaust port 47 which extends through the wall of the body portion, and a conduit 48 which connects therewith is adapted to discharge into the drain pipe 20. The diaphragm 46 is provided with a wear plate 46ª for preventing injury thereto from its repeated contact with the end of the valve stem 57 when communication is cut off from the opposite side of said diaphragm.

The upper end of the body portion 31 has a threaded recess 49 forming a chamber 51, which communicates with the pressure port 24 and a tension regulating nut 52 engages the threaded recess 49 and has a center recess 53 therein and a spring 54 in said recess which bears against the upper end of the same and against a shoulder on the valve 56 in the chamber 51. This valve has a stem 57 which is fluted as at 58 and which extends through the opening 59 forming communication between the chambers 51 and 43 when the valve 56 is raised to permit pressure fluid to enter from said chamber 51 to the chamber 43 through the flutes 58 as later explained. The upper end of the chamber 43 is provided with a passageway 61 which communicates with a port 62 connected by a conduit 63 to the diaphragm valve B.

The diaphragms 36 and 46 are composed of flexible material such as thin metal or rubber and the lower diaphragm 36 is shown in the drawing as being concavo-convex in order to provide sufficient upward movement thereof to raise the plunger 39 when pressure is admitted to the chamber 29 through the port 28.

The operation of my improved accelerator device which will now be considered in connection with a hot water supply tank is as follows:

Let us assume, for descriptive purposes, that the thermostatic member has its parts in the position shown in Fig. 1 where the liquid in the tank A has been heated to a predetermined temperature and the tube 12 expanded to draw the valve lever 13 against the port 16 to close the same.

Let us suppose, for the purpose of illustration, that the line pressure of the fluid supply through the conduit 8 is 15 pounds per square inch. The pressure through the take-off conduit 21, through the T 22, the conduit 23, and to the port 24 will also be 15 pounds per square inch, but the pressure in the conduit 17 which has the restriction 26 therein and which, when the port 16 was opened discharged into the pipe 19, will upon the closing of said port by the lever valve 13 accumulate and build up a pressure in the said conduit 17 which pressure is also exerted through the port 28 and against the diaphragm 36 in the chamber 29.

When the pressure has been built up sufficiently to overcome the tension of the spring 41, which we will assume to be 5 pounds per square inch, the plunger will be pressed upward by the diaphragm 36 until the leg of the passageway 44 rests against the bottom of the valve stem 57 which will cut off communication between the opposite sides of the diaphragm 46 in the chamber 43. As the pressure continues to build up and increase in the conduit 17, and consequently, against the lower face of the diaphragm 36, the plunger 39 will continue to rise and will overcome the tension of the spring 54 above the valve 56 whereupon the said valve will open, and pressure fluid will be admitted from the port 24 into the chamber 51, through the valve 56, around the flutes 58 and into the chamber 43. The passageway 45 having been closed by the upward movement of the plunger 39, the pressure fluid will pass through the passageway 61 and the port 62 into the conduit 63 and will be exerted against the diaphragm in the valve B so as to gradually overcome the tension of the spring (not shown) therein and reduce the orifice through which the temperature changing fluid has been entering the coil 6 from the supply pipe 4.

As the pressure continues to build up in the conduit 17 the pressure against the diaphragm 36 will continue to increase further opening the valve 56 to the admission of line pressure fluid from the port 24. When the pressure in the conduit 63 equalizes the pressure through the port 28, the pressure of the fluid upon the upper face of the diaphragm 46 will equalize the pressure against the lower face of the diaphragm 36 so that the balancing of the diaphragms will be attained.

When the temperature of the liquid in the tank A has dropped by reason of the restricted amount of temperature changing fluid admitted to the coil 6 the thermostatic tube 12 will commence to contract and will open the lever valve 13 thus permitting the discharge of the pressure fluid through the port 16 into the thermostatic cover 18 and through the pipe 19 to the drain pipe 20. The pressure in the conduit 17 thus being released, the diaphragm 36 will gradually assume the position shown in the drawing and the valve 56 will close by the action of the spring 54 when the plunger 39 has dropped to the position shown in the drawing, at which time the pressure in the line 63 will be reduced by the fluid therein passing therefrom through the port 62 and passageway 61 to the upper side of the chamber 43 where it will discharge through the passageway 44 in the end of the plunger and through the exhaust port 47 and conduit 48 to the drain pipe 20, which will release all pressure on the diaphragm of the temperature changing fluid valve B and permit said valve to open and again supply the coil 6 so as to heat the surrounding liquid in the tank A.

It will be noticed that the description thus far has dealt with the extreme conditions of the thermostatic control where the valve B has been either opened fully to permit the temperature changing fluid to enter the coil 6 or where the same has been closed to entirely cut off the entrance of said fluid, but in the actual operation of the device, the thermostatic tube will expand and contract upon a very slight change in the temperature of the liquid in the tank A and the lever valve 13 will be operated thereby so as to release and build up the pressure in the conduit 17, which is exerted against the lower face of the diaphragm 36 and thus a balancing of the diaphragms will be attained and the diaphragm valve B will be nicely regulated to admit greater or lesser quantities of the temperature changing fluid as is required by the slightest temperature change of the liquid in the tank A.

It will readily be seen that, in order to actuate the valve B governing the admission of temperature changing fluid to the tank A, a large amount of fluid pressure is necessary. To obtain the nicety of regulation desired, it will at once be apparent that the diaphragm 36 will be actuated by a very small amount of fluid pressure built up in the conduit 17 through the restriction 26 controlled by the slightest change in the thermostatic member C. This actuation of the diaphragm 36 controls a much greater fluid pressure direct from the line to the conduit 63 which actuates the valve B so that the device is properly called an accelerator or multiplying device.

The accelerator as shown and described can never have its supply and exhaust valves open at the same time, but must always be in one of three positions, viz: (1) Supply and exhaust valves closed, diaphragms balanced and pressure fluid not in motion; (2) supply valve open and exhaust valve closed; or (3) supply valve closed and exhaust valve open.

It will also be apparent that while I have described my invention as applied to a hot water tank, the same may be included in a cold water system with equal efficiency, hence, I do not limit myself to the device as actually applied herein.

It will be seen that with the use of the accelerator, or balancing device D, operated from the thermostatic device and used to control the diaphragm valve B that a graduated action of the valve B will always be obtained and the coil 6 will be supplied with just sufficient temperature changing fluid to keep the liquid in the tank A at the desired temperature. This graduated action, or balancing, has been impossible of attainment heretofore in tanks of this type where thermostatic means has been used for operating the temperature changing fluid valve as the thermostatic column always expands or contracts a considerable distance by the action of the fluid in the tank before the valve for admitting the fluid operates, and when such operation does take place the valve either opens or closes so as to admit the full capacity of fluid through the valve, or entirely closes off the same. In the well known types of thermostatically controlled tanks the temperature can not be held in such narrow range as with the use of my improved accelerator, and actual practice has proven that, when my device is incorporated in a system of this kind, the temperature of the liquid in the tank may be kept at very near a constant and will in no event vary more than 1 to 2 degrees.

While I have shown and described a preferred combination incorporating my improved accelerator, it should be understood that I do not limit myself to such a combination of elements, and since the details of construction of the accelerator are capable of wide modification and variation, I do not limit myself to the exact design shown and described, but reserve all such modifications,

I claim:

1. An accelerator device comprising an upper and lower admission port adapted to be connected to a source of fluid pressure, flexible means carrying a plunger, the upper end of which extends into a chamber and against a flexible member dividing the chamber transversely, a passageway extending through the end of said plunger and communicating with an opening in said flexible member, a port on each side of said flexible member and leading therefrom, and a check valve between said upper port and said chamber, said valve having a stem extending into said chamber and adapted to close the opening in said flexible member when pressure is exerted under said flexible means.

2. A fluid pressure device comprising an upper and lower admission port connected in parallel to a source of fluid pressure, a restriction in the passage leading to said lower port, thermostatic means governing the building of pressure through said lower port, said upper port communicating with a pressure controlled valve, a check valve between said upper port and said valve having a stem extending into a chamber, said chamber being divided by a diaphragm and having an exhaust port at the lower side thereof, a diaphragm operated by the pressure from said lower port and having a plunger extending into said chamber and against said diaphragm therein, a port in the end of said plunger for establishing communication between the sides of said chamber diaphragm, said plunger being adapted to be raised by pressure exerted on the diaphragm controlled by the lower port so as to close the port in the end of said plunger and to raise said check valve to admit pressure to the valve and to the chamber diaphragm, and to be lowered when the pressure on the chamber diaphragm overcomes the pressure on the diaphragm controlled by the lower port and permit the exhaust from the valve through the upper port of the chamber, the port in the end of said plunger and the exhaust port, so as to establish a balancing of said diaphragms through the action of the thermostatic means.

3. A fluid pressure device comprising an upper and lower admission port connected in parallel to a source of fluid pressure, a restriction in the passage leading to said lower port, thermostatic means governing the building up of pressure through said lower port, a diaphragm in said device controlled by the pressure from said lower port, a check valve beyond said upper port having its stem extending into a central chamber, a second diaphragm dividing said chamber, a column operated by said first diaphragm having its upper end bearing against said second diaphragm, a port in the end of said column communicating with the opposite sides of said second diaphragm, an exhaust port leading from the chamber below said second diaphragm, a port leading from said chamber above said second diaphragm, said column adapted to be raised when pressure is built up against said first diaphragm, whereby closing the port in the end thereof by pressure against the end of the check valve stem, said check valve adapted to be opened by the further raising of said column so as to admit line pressure to the upper end of said chamber and through the port leading therefrom, and said column being lowered by the action of the pressure on said second diaphragm thereby closing said check valve and opening said port in said column to permit the pressure from the port above said diaphragm to pass through the same and exhaust through the port leading from the chamber below said diaphragm.

4. A combination with a source of fluid pressure and a presure-actuated device connectible alternately with pressure and exhaust of means for connecting said pressure-actuated device with pressure and exhaust comprising valve means for alternatively connecting the pressure-actuated device with pressure and exhaust, pressure-actuated means for opening said valve means to connect the pressure-actuated device with pressure, and means whereby said opening of the valve means causes pressure to be exerted to oppose further opening of the valve means.

5. A combination with a source of fluid pressure and a pressure-actuated device connectible alternately with pressure and exhaust of means for connecting said pressure-actuated device with pressure and exhaust comprising valve means for alternatively connecting the pressure-actuated device with pressure and exhaust, pressure-actuated means for opening said valve means to connect the pressure-actuated device with pressure, and means whereby said opening of the valve means causes pressure to be exerted to oppose further opening of the valve means, comprising pressure-actuated means controlled by the pressure on the outflow side of said valve means for opposing the action of the pressure-actuated valve opening means.

6. A combination with a source of fluid pressure and a pressure-actuated device connectible alternately with pressure and exhaust of means for connecting said pressure-actuated device with pressure and exhaust comprising valve means for alternatively connecting the pressure-actuated device with pressure and exhaust, pressure-actuated means for opening said valve means to connect the pressure-actuated device with pressure, and means whereby said opening of the valve means causes pressure to be exerted to oppose further opening of the valve means, comprising a pressure-actuated diaphragm controlled by the pressure on the outflow side of said valve means for opposing the action of the pressure-actuated valve opening means.

7. A combination with a source of fluid pressure and a pressure-actuated device connectible alternately with pressure and exhaust of means for connecting said pressure-actuated device with pressure and exhaust comprising valve means for alternatively connecting the pressure-actuated device with pressure and exhaust, pressure-actuated means for opening said valve means to connect the pressure-actuated device with pressure, and means whereby said opening of the valve means causes pressure to be exerted to oppose further opening of the valve means, comprising a pressure-actuated diaphragm controlled by the pressure on the out-flow side of said valve means for opposing the action of the pressure-actuated valve opening means, said diaphragm having a port therethrough which is closed upon the opening of said valve means.

In witness whereof, I have hereunto subscribed my name.

JOHN M. LARSON.